(12) United States Patent
Scott

(10) Patent No.: US 8,060,685 B2
(45) Date of Patent: Nov. 15, 2011

(54) ELECTRONIC DEVICE DATA ACCESS SYSTEM AND METHOD

(75) Inventor: Jayne E. Scott, Sugar Land, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 729 days.

(21) Appl. No.: 11/888,367

(22) Filed: Jul. 31, 2007

(65) Prior Publication Data

US 2009/0037667 A1    Feb. 5, 2009

(51) Int. Cl.
*G06F 12/00* (2006.01)
(52) U.S. Cl. ......... 711/103; 711/100; 711/112; 711/144
(58) Field of Classification Search .................. 711/100, 711/103, 112, 144
See application file for complete search history.

(56) References Cited

U.S. PATENT DOCUMENTS

| 6,996,641 | B2 | 2/2006 | Zimmer et al. |
| 7,165,170 | B2 | 1/2007 | Rothman et al. |
| 7,243,222 | B2 | 7/2007 | Rothman et al. |
| 7,454,673 | B2 * | 11/2008 | Packer Ali et al. ............ 714/723 |
| 2004/0139310 | A1 | 7/2004 | Maeda et al. |
| 2007/0005871 | A1 | 1/2007 | Zimmer et al. |

OTHER PUBLICATIONS

PCT International Search Report and Written Opinion in co-pending PCT International Application No. PCT/US2008/008361, International Filing Date of Jul. 7, 2008 and entitled "Electronic Device Data Access System and Method" having a date of mailing of Feb. 12, 2009.

* cited by examiner

*Primary Examiner* — Jasmine Song

(57) ABSTRACT

An electronic device data access method comprising sharing, by an operating system and a pre-boot environment module, data stored in a hard disk drive in the electronic device and accessing the data using a block location list identifying a storage location for each portion of the stored data.

24 Claims, 3 Drawing Sheets

ELECTRONIC DEVICE DATA ACCESS SYSTEM AND METHOD

BACKGROUND

A single data file is typically stored in multiple portions in a hard drive. When an electronic device receives a request for the data file, the electronic device needs to be able to identify all portions associated with the single data file to present a complete set of data to the requester. However, obtaining sector and/or logical block address information to access the data file may be difficult, especially with different operating systems and/or pre-boot environments that may be used to store the data file on the hard drive.

DETAILED DESCRIPTION OF THE DRAWINGS

Figure 1:
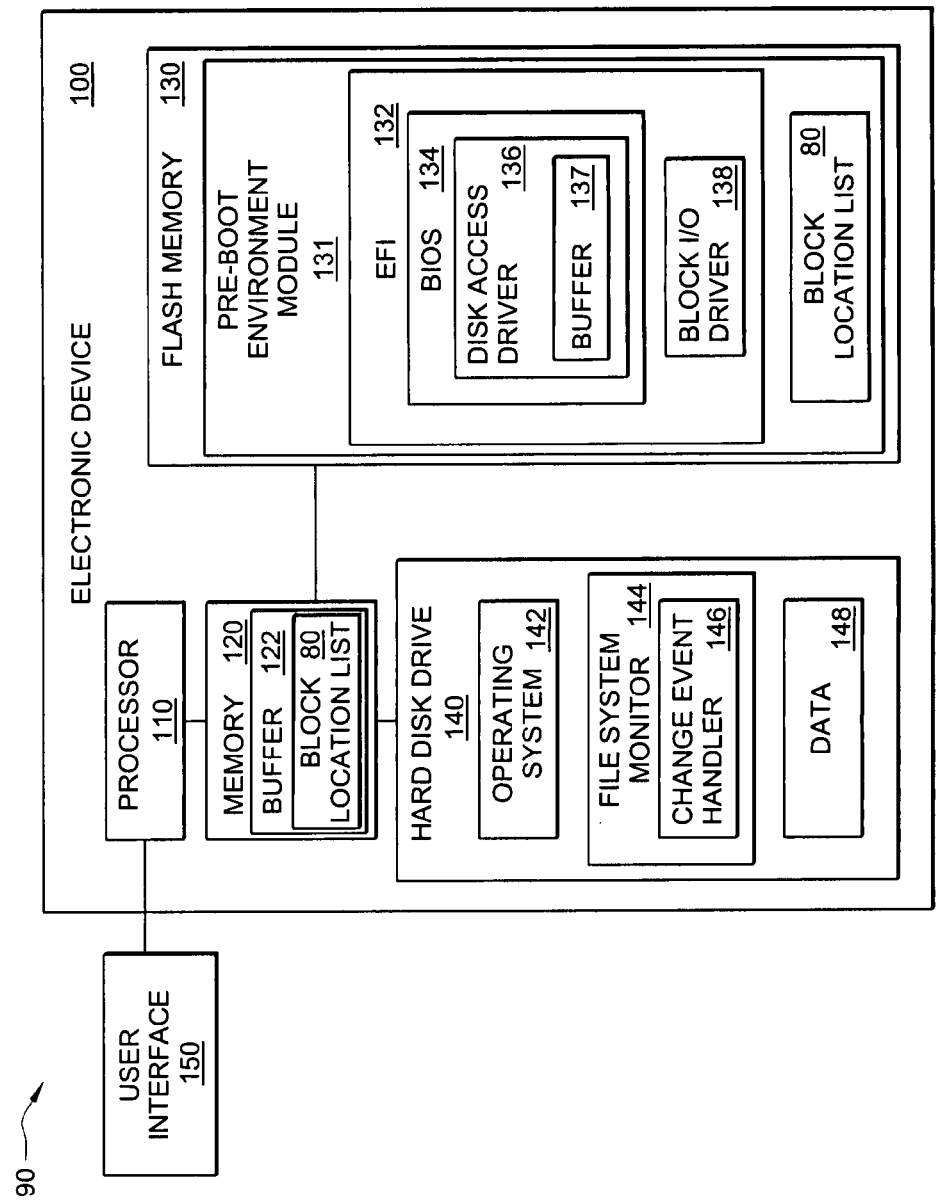
FIG. 1 is a block diagram of an electronic device in which an embodiment of a data access system is employed to advantage.

FIG. 1 is a block diagram of an electronic device 100 comprising an embodiment of a data access system 90. In the illustrated embodiment, data access system 90 is configured to enable sharing of a set of data during both initialization and operations of electronic device 100 and is configured to enable access to the set of data by identifying the hard disk drive sector locations for the set of data in electronic device 100. Electronic device 100 can be any type of electronic device such as, but not limited to, a laptop computer, a desktop computer, a tablet computer, a personal digital assistant (PDA), a cellular phone, a gaming device or any other type of portable or non-portable electronic device. In FIG. 1, user interface 150 is coupled to electronic device 100 and may comprise any module and/or component (e.g., a display screen, a keyboard, a mouse, etc.) configured to enable a user to request access to a set of data stored in electronic device 100. User interface 150 may form part of electronic device 100 or may be attachable to electronic device 100. It should be understood, however, that user interface 150 may be otherwise absent from data access system 90.

In the illustrated embodiment, data access system 90 comprises a processor 110, a memory 120, a flash memory 130 and a hard disk drive 140. It should be understood that components in data access system 90 may be a hardware only embodiment, a software only embodiment, or any combination thereof. In the illustrated embodiment, processor 110 is used to manage and/or execute protocols and/or instructions corresponding to accessing and/or sharing stored data associated with data access system 90. In some embodiments, memory 120 comprises a buffer 122 configured to store information received from an operating system 142 and transferred to a BIOS 134. In FIG. 1, buffer 122 comprises a block location list 80 configured to identify a sector and/or logical block address location for each portion of data stored in hard disk drive 140. In general, data stored in hard disk drive 140 is not stored in one contiguous storage location but, instead, is stored in a plurality and/or a number of separate storage locations. Block location list 80 identifies all the corresponding storage locations for each portion of a corresponding set of stored data. A "portion" as used herein is a part or segment of stored data. It should be understood that block location list 80 can be otherwise configured (e.g., a relational database, a chart, a worksheet, etc.).

In FIG. 1, flash memory 130 is a non-volatile memory component configured to store and/or transfer data and/or information used to enable access to data stored in electronic device 100. In the illustrated embodiment, flash memory 130 comprises pre-boot environment 130 configured to manage and/or control the initialization and/or booting processes for electronic device 100 and enables data stored in hard disk drive 140 to be accessed by pre-boot environment 130 when the data is controlled by another component of electronic device 100. It should be understood that, although pre-boot environment 130 herein resides in flash memory 130, pre-boot environment 130 can also reside in an any other storage and/or memory element (e.g., hard disk drive 140, an external memory system, etc.). In FIG. 1, pre-boot environment 130 comprises block location list 80 and an extensible framework interface (EFI) 132. In the illustrated embodiment, during normal operations, block location list 80 is transferred from buffer 122 in memory 120 and subsequently stored in flash memory 130 for use during initialization processes. "Normal operations" as used herein are the processes, applications, and/or data available to a user and/or other components in electronic device 100 to enable the user and/or electronic device 100 to operate subsequent to the completion of initialization processes. In some embodiments, EFI 132 is a software module and/or a set of instructions configured to manage and/or perform initialization and boot services associated with operating system 142 of electronic device 100. In the illustrated embodiment, EFI 132 comprises a basic input/output system (BIOS) 134 and a block I/O (input/output) driver 138. BIOS 134 is configured to manage and/or control the initialization processes for electronic device 100. In some embodiments, BIOS 134 comprises a disk access driver 136 configured to retrieve a specific set and/or portion of data from hard disk drive 140 to be used by BIOS 134 during initialization processes using block location list 80. Data access driver 136 also creates a buffer 137 to store the retrieved block location list 80 and the specific set of data requested. Block I/O driver 138 receives and transmits the set and/or portion of data stored in hard disk drive 140 at block location list 80 to buffer 137.

In the illustrated embodiment, hard disk drive 140 comprises operating system 142, a file system monitor 144, and data 148. It should be understood that operating system 142 can be any set of executable instructions and/or programs that manages the hardware and/or software resources of electronic device 100. In FIG. 1, during normal operations, operating system 142 maintains a file system scheme that stores the location of each file located on hard disk drive 140. In FIG. 1, file system monitor 144 is a set of instructions and/or executable commands configured to request the sector and/or logical block address information by operating system 142. In response to a portion of the corresponding stored data 148 being modified (e.g., added, deleted, changed etc.). In the illustrated embodiment, file system monitor 144 comprises a change event handler 146 configured to monitor the updating of information and/or files in data 148. If a change and/or modification is made to data 148, then change event handler 146 transmits a request to operating system 142 to retrieve and/or identify the new sector and/or logical block address locations for the changed portion of data 148 so that the changes and/or modifications to block location list 80 is properly and/or accordingly updated. In some embodiments, data 148 is information and/or data which requires the resources and/or initialization processes of pre-boot environment module 131 and/or BIOS 134 (e.g., a bit map, user configuration information, etc.). Data 148 is stored in hard disk drive 140, because BIOS 134 does not have enough capacity and/or storage space to store data 148.

Thus, in operation, operating system 142 maintains the location of each file based on the file system scheme. File system monitor 144 stores the block location list 80 in buffer 122. File system monitor 144 then transfers a copy of block location list 80 to BIOS 134 for storage in flash memory 130 and for use during initialization processes, thereby enabling both operating system 142 and pre-boot environment module 131 to access and/or share data 148. During initialization processes, BIOS 134 determines whether a set of block location list 80 is stored in flash memory 130. In response to identifying block location list 80 in flash memory 130, BIOS 134 launches disk access driver 136 to retrieve block location list 80 and read/identify the corresponding block location list 80 for data 148 stored in hard disk drive 140. Disk access driver 136 also creates buffer 137 to store requested data 148 and/or any other data from block location list 80. Disk access driver 136 transmits a request to block I/O driver 138 to retrieve data 148 stored at logical block address 80. Block I/O 138 retrieves the data at the logical block address 80 and stores the data in buffer 137, thereby enabling access to data 148 during initialization processes. BIOS 134 then completes initialization process for electronic device 100 using the data stored in buffer 137. If, however, no block location list 80 are stored in flash memory 130, BIOS 134 unloads disk access driver 136 and continues to initialize electronic device 100. It should be understood that embodiments of data access system 90 also enable data stored in flash memory 130 to be accessed and/or shared by other components in electronic device 100 (e.g., operating system 142).

Embodiments of data access system 90 also enable block location list 80 to be updated whenever data 148 is changed and/or modified. Thus, in operation, file system monitor 144 identifies a request to change and/or update the information stored in data 148 and, therefore, forms/issues a change event. Change event handler 146 receives the change event from file system monitor 144 and sends a request to operating system 142 to retrieve the current block locations for data 148. Operating system 142 then identifies the new sector and/or logical block address information for the changed portions of data 148. File system monitor 144 then updates block location list 80 with the new sector and/or logical block address information and saves the changes in buffer 122 and sends a copy of the new block location list 80 to BIOS 134 of pre-boot environment module 131 for use the next time electronic device 100 is initialized.

Figure 2:
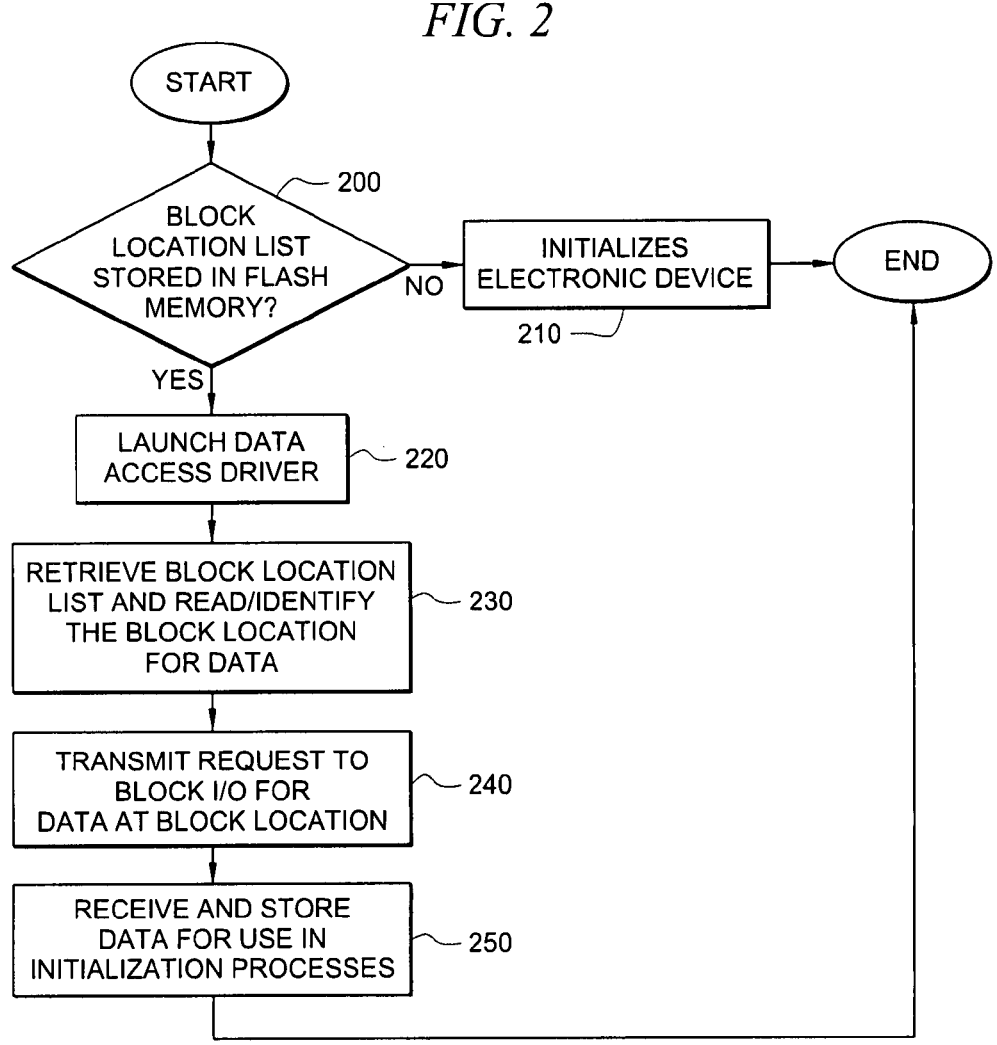
FIG. 2 is a flowchart illustrating an embodiment of an electronic data access method.

FIG. 2 is a flow chart illustrating an embodiment of an electronic data access method for data access system 90. The method begins at decision block 200 with data access system 90 determining whether block location list 80 is stored in flash memory 130. If block location list 80 is not stored in flash memory 130 ("no" output to block 200), data access system 90 initializes electronic device 100 (block 210), with the method terminating thereafter. If, however, block location list 80 is stored in flash memory 130 ("yes" output to block 200), data accessing system 90 then launches data access driver 136 (block 220). Data access driver 136 then retrieves block location list 80 and reads/identifies the corresponding block location indicated in block location list 80 for data 148 (block 230). Data access driver 136 then transmits a request to block I/O driver 138 for data 148 at the corresponding block location (block 240). Data access driver 136 then receives data 148 and stores data 148 in buffer 137 for use by BIOS 134 during initialization processes (block 250), with the process terminating thereafter.

Figure 3:
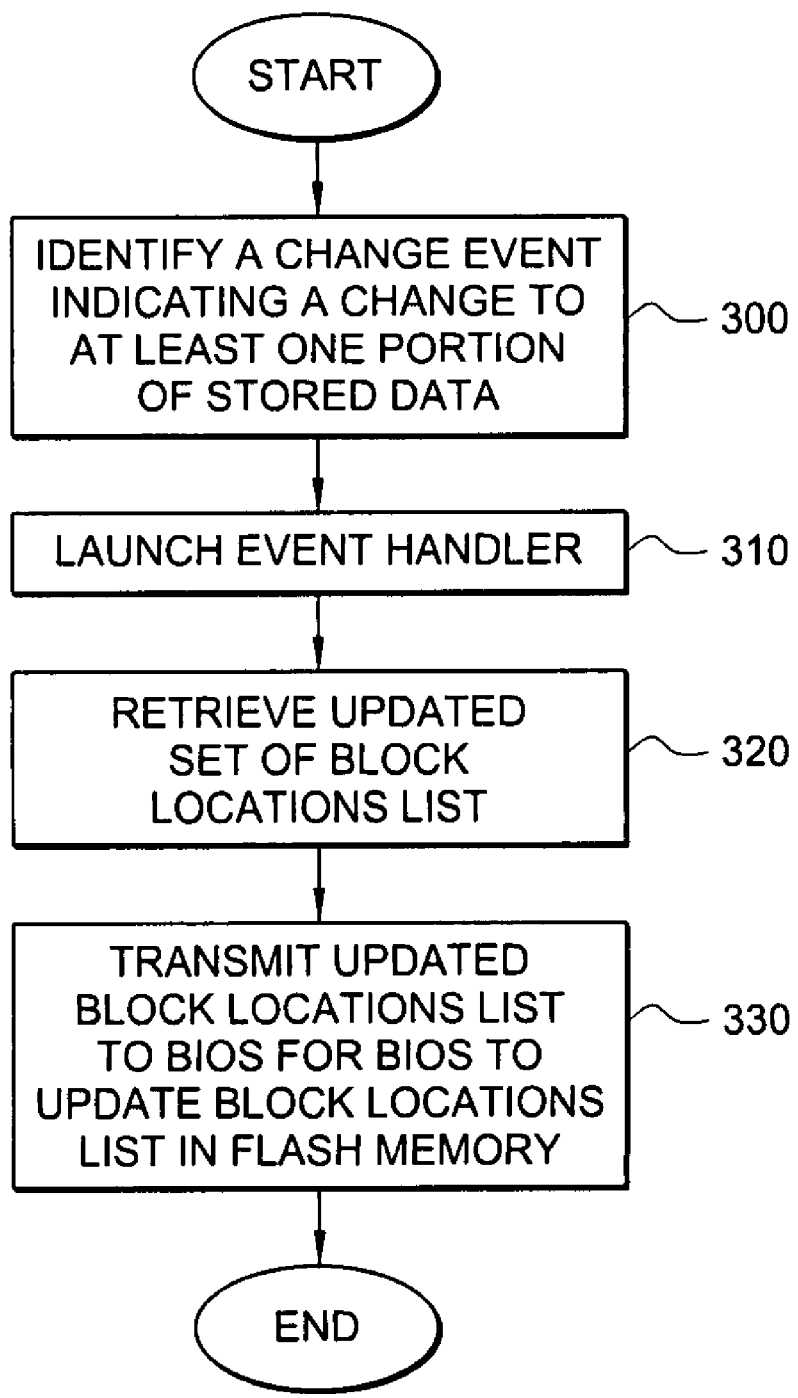
FIG. 3 is a flowchart illustrating another embodiment of an electronic data access method.

FIG. 3 is a flow chart illustrating another embodiment of an electronic data method for data access system 90. The method begins at block 300 with data access system 90 identifying a change event indicating a change to at least one portion of stored data 148 stored in hard disk drive 140. File system monitor 144 launches change event handler 146 which requests operating system 142 to identify the new updated sector and/or logical block address information for block location list 80 (block 310). Operating system 142 then retrieves the new sector and/or logical block address information, and file system monitor 144 updates block location list 80. Data access system 90 stores the updated block location list 80 in buffer 122 of memory 120 (block 320). Change event handler 146 then transmits the updated block location list 80 to BIOS 134, and BIOS 134 updates block location list 80 in flash memory 130 with the updated information (block 330). In some embodiments, after updated block location list 80 is transferred, buffer 122 is deleted, with the method terminating thereafter.

The illustrative embodiments may be implemented in software and can be adapted to run on different platforms and operating systems. In particular, functions implemented by data access system 90, for example, may be provided by an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electro-magnetic, infrared, or semiconductor system, apparatus, device, or propagation medium.

Embodiments of data access system 90 enable electronic device 100 to access and/or share data 148 stored in hard disk drive 140 during normal and/or initialization processes for electronic device 100. Embodiments of data access system 90 uses sector and/or logical block address information stored in block location list 80 to identify the storage locations for each portion of stored data 148. BIOS 134 uses block location list 80 to retrieve the data 148 for use during initialization processes.

What is claimed is:
1. A method, comprising:
  storing, in a non-volatile memory, a block location list that identifies storage locations of data stored across sectors in a hard disk drive of an electronic device;
  transferring the block location list to a basic input/output system (BIOS) of the electronic device to enable the BIOS to retrieve the block location list during initialization of the electronic device;
  reading, by the BIOS during the initialization of the electronic device and during subsequent initializations of the electronic device, the block location list to identify the storage locations of requested data stored in the hard disk drive; and
  retrieving, during the initialization of the electronic device, the requested data from the storage locations in the hard disk drive.

2. The method of claim 1, further comprising storing, during the initialization of the electronic device, the requested data retrieved from the hard disk drive in a buffer.

3. The method of claim 1, further comprising determining, by the BIOS of the electronic device during the initialization of the electronic device, whether the non-volatile memory stores the block location list.

4. The method of claim 1, wherein the BIOS further comprises a data access driver that retrieves the data from the hard disk drive during the initialization process, and a BIOS input/output (I/O) driver that transmits the data to a buffer.

5. The method of claim 1, further comprising:
sending a copy of an updated block location list to the BIOS of the electronic device;
storing the updated block location list in flash memory;
accessing, by the BIOS during a subsequent initialization of the electronic device, the updated block location list in the flash memory.

6. The method of claim 1, further comprising sending, by an operating system of the electronic device, updates of the block location list to the BIOS of the electronic device.

7. The method of claim 1, further comprising transmitting an updated set of logical addresses to a flash memory component in response to at least one portion of data stored in the hard disk drive being modified.

8. An electronic device, comprising:
a hard disk drive that stores data and a block location list that identifies storage locations of the data stored in the hard disk drive; and
a non-volatile memory that stores a basic input/output system (BIOS) and a copy of the block location list, wherein the BIOS reads the copy of the block location list during each initialization process of the electronic device and retrieves data from the hard disk drive during the initialization process of the electronic device.

9. The electronic device of claim 8, wherein the BIOS further comprises a data access driver that retrieves the data from the hard disk drive during the initialization process, and a BIOS input/output (I/O) driver that transmits the data to a buffer.

10. The electronic device of claim 8, further comprising a pre-boot environment module that includes the BIOS and retrieves, during the initialization process, the copy of the block location list stored in a flash memory component.

11. The electronic device of claim 8, further comprising a disk access driver that retrieves data from the hard disk drive during the initialization process of the electronic device.

12. The electronic device of claim 8, wherein the BIOS launches a disk access driver that retrieves the copy of the block location list from a flash memory component in response to identifying logical block addresses of data stored in the hard disk drive.

13. The electronic device of claim 8, further comprising a file system monitor updating the copy of the block location list in response to identifying a change to at least one portion of the data stored in the hard disk drive.

14. The electronic device of claim 8, further comprising an event handler launched by a file system monitor in response to identifying a change to at least one portion of the data, the event handler configured to monitor updating of the copy of the block location list.

15. The electronic device of claim 8, further comprising an event handler transmitting an updated set of logical addresses to a flash memory component in response to at least one portion of the data stored in the hard disk drive being modified.

16. A computer-readable medium having stored thereon an instruction set to be executed, the instruction set, when executed by a processor in an electronic device, causes the processor to:
store, in a non-volatile memory, a block location list that identifies drive sector locations of data stored in a hard disk drive of the electronic device;
transfer the block location list to a basic input/output system (BIOS) of the electronic device to enable the BIOS to retrieve the block location list during an initialization process of the electronic device;
read, by the BIOS during the initialization process of the electronic device, the drive sector locations in the block location list to identify requested data stored in the hard disk drive of the electronic device; and
retrieve, by the BIOS during the initialization process of the electronic device, the requested data from the hard disk drive.

17. The computer-readable medium of claim 16, wherein the hard disk drive stores an operating system (OS) for the electronic device, the OS and the BIOS having access to the block location list.

18. The computer-readable medium of claim 16, wherein the instruction set, when executed by the processor, causes the processor to retrieve, by a pre-boot environment module, the block location list stored in a flash memory component.

19. The computer-readable medium of claim 16, wherein the instruction set, when executed by the processor, causes the processor to store in a disk access driver data for use by a pre-boot environment module during the initialization process for the electronic device.

20. The computer-readable medium of claim 16, wherein the block location list is stored in both the BIOS and the hard disk drive to enable both the BIOS and an operating system stored in the hard disk drive to access the data stored in the hard disk drive.

21. The computer-readable medium of claim 16, wherein the instruction set, when executed by the processor, causes the processor to launch, by the BIOS, a disk access driver to retrieve the block location list and then read the block location list to identify the drive sector locations for the data.

22. The computer-readable medium of claim 16, wherein the instruction set, when executed by the processor, causes the processor to receive an updated block location list for subsequent initializations of the electronic device.

23. The computer-readable medium of claim 16, wherein the instruction set, when executed by the processor, causes the processor to identify storage locations for a set of logical addresses and update the set of logical addresses with new storage locations in response to at least one portion of the data being modified.

24. The computer-readable medium of claim 16, wherein the instruction set, when executed by the processor, causes the processor to transmit an updated set of logical addresses to a flash memory component in response to at least one portion of the data being modified.

* * * * *